Feb. 5, 1929.  A. LAUKHUFF  1,701,327
CLUTCH
Filed April 29, 1925   3 Sheets-Sheet 1
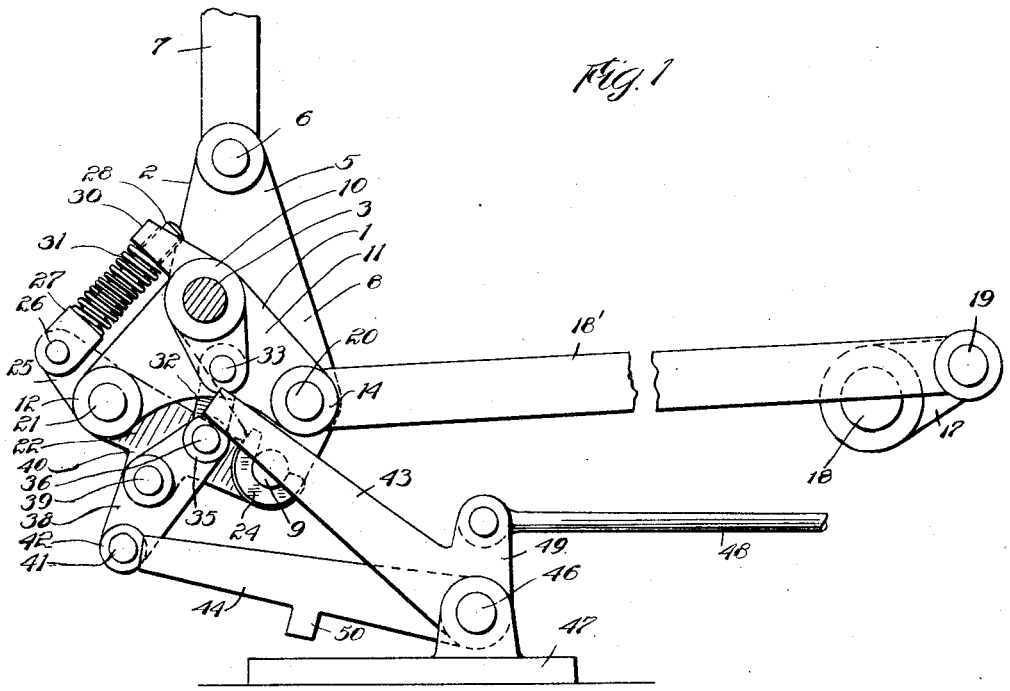
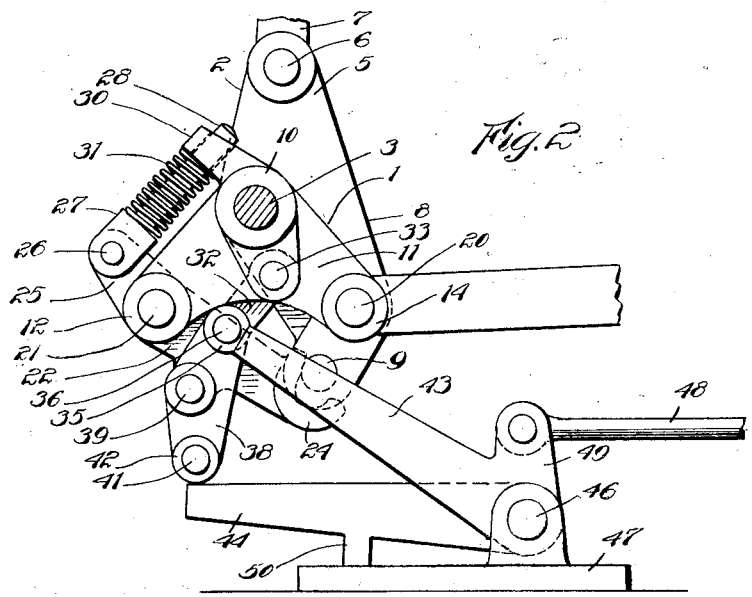

Feb. 5, 1929.                                              1,701,327
A. LAUKHUFF
CLUTCH
Filed April 29, 1925          3 Sheets-Sheet 2
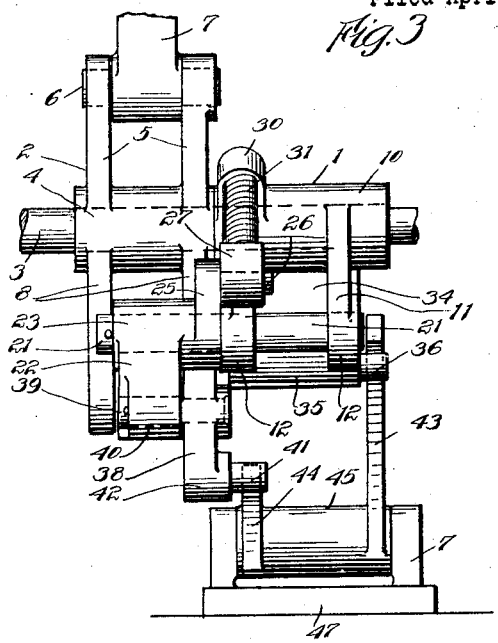
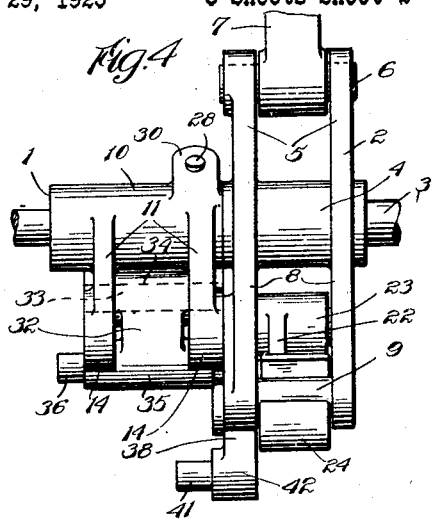
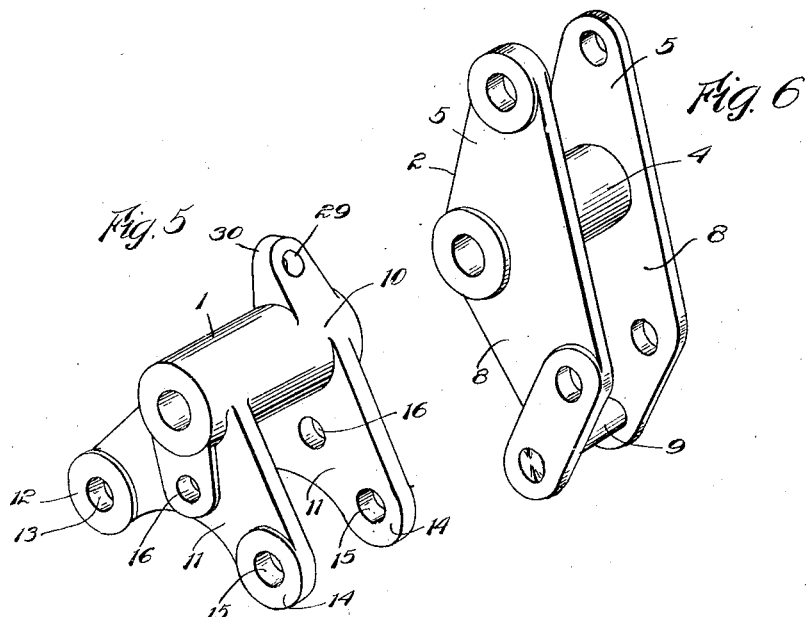
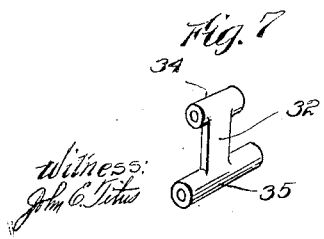
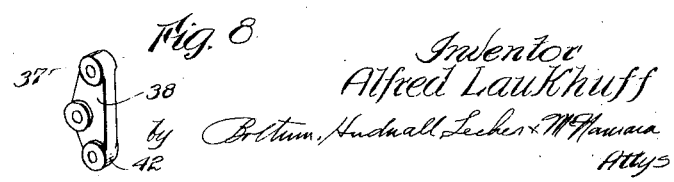
Inventor
Alfred Laukhuff Feb. 5, 1929.
A. LAUKHUFF
CLUTCH
Filed April 29, 1925
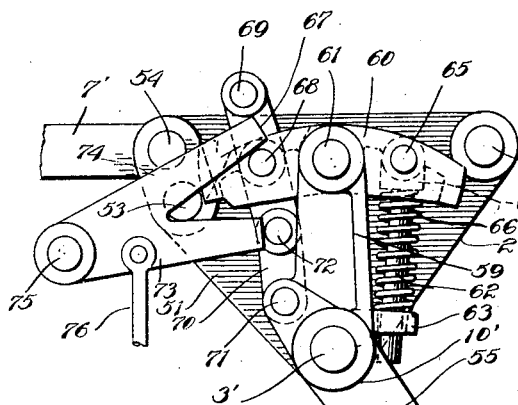
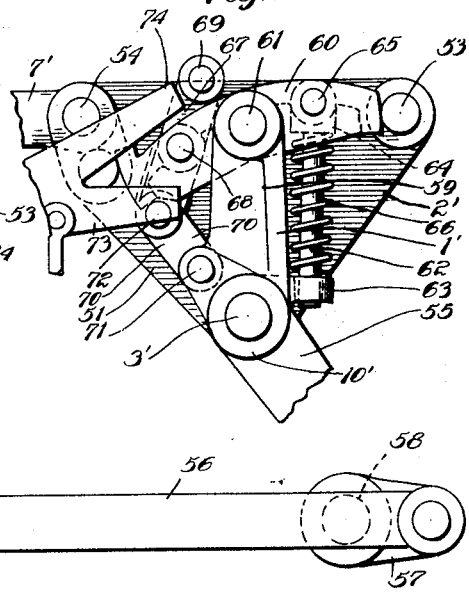
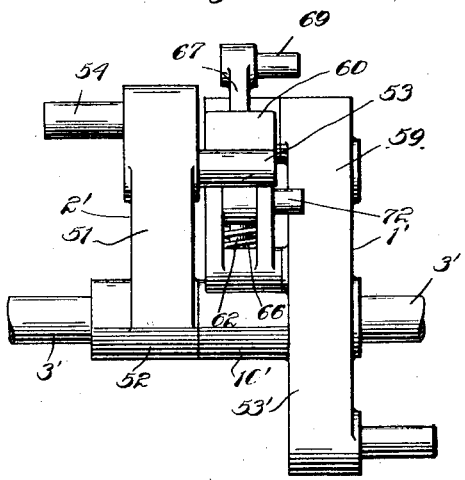

Patented Feb. 5, 1929.

1,701,327

UNITED STATES PATENT OFFICE.

ALFRED LAUKHUFF, OF MILWAUKEE, WISCONSIN.

CLUTCH.

Application filed April 29, 1925. Serial No. 26,582.

This invention relates to improvements in clutches of the positive-acting type, and more particularly to means for effecting engagement and disengagement of the driving and driven members.

In operating many different kinds of machines, such as punch presses, cutting machines and the like, which are not operated continuously from the driving or line shaft, but only at times when the material to be punched or cut is placed into the machine, it has been the practice to provide a clutch of some kind between the driving or line shaft and the driven shaft or member directly connected to the machine, the clutch being under the control of the operator at all times so that he is able to operate or stop the machine at will. Machines of the character referred to above are in many instances operated at high speed so that where the clutch is of the positive-acting type considerable stress is placed upon the line shaft and the driving and driven members comprising the clutch upon movement of these members into operative relation for movement together, this being due to the fact that heretofore the construction of these positive-acting clutches and the manner in which they operate have been such that the driving and driven members are engaged when the same are moving relatively to each other.

One of the objects of the present invention, therefore, is to provide an improved clutch for operating machines of the character referred to above which is positive-acting, and which works smoothly to connect and disconnect the machine to and from the driving shaft although the latter is rotating at a comparatively high speed.

Another object is to provide an improved clutch of the character referred to above in which the driving member thereof is connected directly to the driving or line shaft for continuous operation thereby and arranged so that at regular predetermined intervals there is no relative movement between the driving and driven members of the clutch, and means adapted to effect instantaneous engagement of said driving and driven members when there is no relative movement between the same.

Another object is to provide an improved clutch of the character referred to above which is simple, durable, and which may be manufactured at a comparatively low cost.

Other objects and advantages will hereinafter appear.

For the purpose of illustrating the invention, several embodiments thereof are shown in the drawings, in which:

Figure 1 is a front elevation, showing the driving and driven members comprising the clutch in engaged relation for movement together;

Fig. 2 is a view similar to Fig. 1, showing the driving and driven members comprising the clutch in disengaged relation;

Fig. 3 is an end elevation, looking toward the right in Fig. 1;

Fig. 4 is an end elevation, looking toward the left in Fig. 1;

Figs. 5, 6, 7 and 8 are detail perspective views;

Fig. 9 is a front elevation of a modified form, showing the driving and driven members comprising the clutch in disengaged relation;

Fig. 10 is a view similar to Fig. 7, showing the driving and driven members comprising the clutch in engaged relation for movement together; and Fig. 11 is an end elevation, looking toward the right in Fig. 9.

Referring more particularly to Figs. 1 to 6, the driving member 1 and the driven member 2 of the clutch are loosely mounted on a common fixed shaft 3 for pivotal movement with respect to each other, the driven member comprising a central bearing 4 for receiving shaft 3, upwardly extending lugs 5 provided with registering apertures at the ends thereof to receive a pin 6 passing through one end of the link 7 connected directly to the machine (not shown), and downwardly extending lugs 8 provided with registering apertures at the ends thereof to receive a case-hardened steel pin 9. The driving member comprises a bearing 10 receiving shaft 3 and downwardly extending spaced lugs or flanges 11 provided at the ends 12 thereof with registering apertures 13, at the ends 14 thereof with registering apertures 15, and at the center thereof with registering apertures 16, for the purpose hereinafter explained. The driving member 1 of the clutch is connected to the crank shaft 17 fixed to the drive or line shaft 18 by means of a suitable connecting rod 18′ having one end thereof connected to the crank pin 19 and the other end thereof fitted loosely between spaced ends 14 of lugs 11 and pivotally mounted on a pin 20 passing through registering apertures 15 through these ends. From the foregoing it will be seen that upon rotation of shaft 18 a reciprocatory or oscillatory movement will be imparted to driving member 1 about fixed shaft 3 as a center.

The means for connecting driven member 2 of the clutch to driving member 1 for rotation therewith about shaft 3 as a center will now be described. A pin 21 extends through registering apertures 13 through ends 12 of driving member 1 and is provided with a press fit therein, one end of the pin extending beyond these ends to the left, as shown in Fig. 3. A connecting member 22 is provided with a bearing 23 intermediate the ends thereof and connected to driving member 1 for movement therewith and relative movement with respect thereto by means of pin 21, the extended end of the latter fitting loosely in bearing 23. As shown in Fig. 1, the crank shaft 17 is almost on dead center, so that driving member 1 and connecting member 22 carried thereby are substantially in their extreme position to the right and about to reverse their motion and move to the left upon further rotation of shaft 18, at which instant there will be no relative movement between driving member 1 and driven member 2. One end of connecting member 22 is provided with a hook 24 adapted and arranged upon pivotal movement thereof with respect to driving member 1 in a counter-clockwise direction about pin 21, as viewed in Fig. 1, to engage with and fit about pin 9, as shown, whereby driven member 2 is connected to driving member 1 for movement therewith. The connecting link 7 will be reciprocated vertically to operate the machine connected therewith as long as hook 24 is engaged with pin 9. The opposite end 25 of connecting member 22 is provided with a pin 26 upon which is loosely mounted the head 27 of a bolt 28 which extends loosely through an opening 29 in a lug 30 which may be cast integrally with driving member 1, a coil spring 31 being arranged upon bolt 28 between the head 27 thereof and lug 30 for urging connecting member 22 in a counter-clockwise direction, as viewed in Fig. 1, about pin 21 to effect and maintain operative engagement of hook 24 and pin 9.

The means for effecting pivotal movement of connecting member 22 about pin 21 and the consequent movement of hook 24 into and out of operative engagement with pin 9 when driving member 1 is substantially in its extreme position to the right, as viewed in Figs. 1 and 2, and in which position there is no relative movement between hook 24 and pin 9, will now be described. An element 32 is pivotally connected to driving member 1 by means of a pin 33 provided with a press fit in registering apertures 16, the upper end 34 of the element being formed to provide a bearing for receiving the pin and fitting loosely between flanges 11. The lower end 35 of element 32 is formed to provide a bearing for receiving a pin 36 which extends loosely through an opening 37 in the upper end of an element 38 which is pivotally connected to connecting member 22 by means of a pin 39 passing loosely through an opening in lug 40 which may be cast integrally with connecting member 22, pin 39 having a press fit in element 38. A pin 41 is fixed into the lower end 42 of element 38 for the purpose hereinafter explained. The elements 32 and 38 form a toggle mechanism having a dead-center position when the elements are in alignment, in which position hook 24 is in inoperative position. When elements 32 and 38 are moved slightly past their dead-center position to the right, as viewed in Fig. 1, connecting member 22 will be moved instantly in a counter-clockwise direction about pin 21 under the action of spring 31 to effect instantaneous engagement of hook 24 with pin 9, the spring also acting to hold the hook and pin in engaged relation. Suitable means, hereinafter described, are provided for effecting this movement of elements 32 and 38 comprising the toggle mechanism to the right of the dead-center position of the latter to permit this instantaneous movement of hook 24 into engaged relation with pin 9 when crank 17 is in or substantially in dead-center position and driving member 1 at the end of its reciprocatory movement to the right, at which instant there is no relative movement between hook 24 and pin 9. When the elements 32 and 38 comprising the toggle mechanism are moved from the position shown in Fig. 1 to that shown in Fig. 2, connecting member 22 is moved in a clockwise direction about pin 21 against the action of spring 31, and hook 24 disengaged from pin 9. As shown in Fig. 2, elements 32 and 38 are moved a slight distance to the left past their dead-center position so that the lower end or bearing 35 of element 32 rests against the lower edges of flanges 11 of the driving member, spring 31 urging connecting member 22 in a counter-clockwise direction, as explained above, and holding elements 32 and 38 in the position shown, the spring thereby acting to hold hook 24 and pin 9 in disengaged relation.

The means for effecting movement of the toggle mechanism to either side of its dead-center position may comprise arms 43 and 44 cast integrally with a sleeve 45 loosely mounted on a pin 46 supported by a suitable base 47, the free end of arm 43 being arranged for movement into the path of movement of pin 36, as shown in Fig. 2, so that this arm strikes pin 36 and causes movement of the toggle mechanism to a position slightly to the left of its dead-center position when driving member 1 reaches the end of its stroke to the right, at which time there will be no relative movement between hook 24 and pin 9. The driving member is thereby disconnected from the driven member, as explained above, at the instant during which there is no relative movement between these members, thereby giving a very smooth action during disengagement of the clutch members. The end of arm 44 is arranged for movement into the path of movement of pin 41 to strike this pin and cause movement of the toggle mechanism to the right of its dead-center position, as shown in Fig. 1, when driving member 1 has reached the end of its stroke to the right, at which instant there is no relative movement between hook 24 and pin 9. When the toggle mechanism passes its dead-center position to the right, connecting member 22 is moved instantly in a counter-clockwise direction about pin 21 under the action of spring 31 to effect instantaneous engagement of hook 24 with pin 9. The angular relation of arms 43 and 44 is such that only one of these arms can be moved into position to engage its respective pin at the same time. Suitable actuating means such as a rod 48 may be connected to a lug 49 cast integrally with sleeve 45 whereby arms 43 and 44 may be moved into their respective positions at the will of the operator. Arms 43 and 44 are so arranged that they normally fall by their own weight to the position shown in Fig. 2, a stop 50 being cast integrally with arm 44 to engage base 47 and hold arm 43 in position to engage pin 36. It is preferred to have arms 43 and 44 assume this position upon release of rod 48 by the operator so that the clutch members will normally be disengaged and the machine disconnected from the drive or line shaft.

The end 42 of element 38 or portion thereof extending outwardly beyond connecting member 22 is the part of the toggle mechanism furthest away from shaft 3 about which it oscillates, as explained above, this end carrying pin 41 which is engaged by arm 44 to effect engagement of the clutch members. The purpose of this construction is to effect movement of elements 32 and 38 from the position shown in Fig. 2 to the right of their dead-center position, as shown in Fig. 1, and consequent engagement of the clutch members, as explained above, upon a comparatively small angular movement of driving member 1 about shaft 3.

The opposite faces of hook 24 which fit about pin 9 are formed on a curve with pin 21 as a center, thus providing for a smooth and snug engagement of the hook and pin upon movement of connecting member 22 in a counter-clockwise direction about pin 21 under the action of spring 31, and ready disengagement of the hook from the pin.

From the foregoing it will be seen that a clutch of the positive-acting type has been provided in which the driving member thereof is connected directly to the drive or line shaft 18 for continuous operation thereby and arranged so that at regular, definite intervals its direction of movement with respect to the driven member will be reversed, at which time there will be no relative movement between the driving and driven members, and suitable means for effecting instantaneous engagement of the driving and driven members when the direction of movement of the driving member with respect to the driven member is reversed, thus giving a very smooth action to the clutch during engagement of the members comprising the same and eliminating the hammer blow and stress on the line shaft caused by the positive-acting clutches constructed heretofore.

The driving and driven members have been shown mounted on a common shaft 3, but of course they may be mounted on separate shafts. The driven member 2 may be made part of the machine.

In the modification shown in Figs. 9, 10 and 11, the driving member 1' and the driven member 2' of the clutch are loosely mounted on the common, fixed shaft 3' for pivotal movement with respect to each other, the driven member comprising a plate 51 provided at the lower end thereof with a bearing 52 receiving shaft 3', and spaced pins 53 for the purpose hereinafter explained. The link 7', connected directly to the machine (not shown), is pivotally connected to plate 51 by means of a pin 54. The driving member 1' comprises a bearing 10' receiving shaft 3, a downwardly extending arm 55 pivotally connected to the connecting rod 56 driven by the crank shaft 57 fixed to the drive or line shaft 58, and an upwardly extending arm 59. The connecting member 60 is pivotally connected to the upper end of arm 59 by means of a pin 61 and arranged for movement between and in alignment with pins 53, as shown in Fig. 10, to connect driven member 2' with driving member 1' for movement therewith. The connecting member 60 fits exactly between pins 53 so that there is no loose motion or play between these parts. A bolt 62 extends loosely through a lug 63 cast integrally with arm 59 and is provided with a head 64 pivotally connected at 65 to connecting member 60, a coil spring 66 being arranged on bolt 62 and held under compression between the head 64 thereof and lug 63 to urge connecting member 60 in a counter-clockwise direction about pin 61 to the position shown in Fig. 10. The toggle mechanism for effecting movement of connecting member 60 to inoperative position and permitting instantaneous movement of the latter to operative position under the action of spring 66, is constructed and operates in the same manner as the toggle mechanism described above and shown in Figs. 1 to 4, and comprises an element 67 pivotally connected at 68 to connecting member 60 and provided with a pin 69 fixed to the upper end thereof, and an element 70 pivotally connected at 71 to driving member 1', elements 67 and 70 having their adjacent ends connected by means of a pin 72. When elements 67 and 70 are moved slightly to the right of their dead-center position, as shown in Fig. 9, connecting member 60 is held in inoperative position thereby, spring 66 acting to hold the elements in this position and pin 72 against arm 59 of the driving member, as shown. When elements 67 and 70 are moved slightly to the left of their dead-center position, movement of connecting member 60 in a counter-clockwise direction about pin 61 under the action of spring 66 will be permitted to effect instantaneous movement of the connecting member to the position shown in Fig. 10, in which position of the latter driven member 2' is connected to driving member 1' for movement therewith, pin 72 engaging the connecting member, as shown, to hold the same in alignment with pins 53 and against further movement under the action of spring 66.

Arms 73 and 74 are loosely mounted on shaft 75 and actuated by means of a suitable connection 76, the end of arm 73 being arranged for movement to engage pin 72, as shown in Fig. 9, to effect disengagement of the clutch members, as explained above, and arm 74 being arranged for movement to engage pin 69, as shown in Fig. 10, to effect engagement of the clutch members for movement together. Engagement of arms 73 and 74 with the respective pins 72 and 69 occurs when crank 58 is on or substantially on dead-center and driving member 1' in its extreme position to the left, as viewed in Fig. 9, during which instant there will be no relative movement between the driving and driven members comprising the clutch. Connecting member 60 is thereby moved into and out of operative relation with respect to pins 53 at the instant during which there is no relative movement between these parts, thus giving a very smooth action to the clutch during engagement and disengagement thereof. Arms 73 and 74 are arranged so that only one of the same can be in engagement with its respective pin at the one time.

The clutch has been described as being particularly useful in connection with machines such as punch presses and cutting machines, but of course it may be used in other connections and is of much broader adaptation. Any changes necessary in adapting the clutch to any particular machine or device will be obvious to those skilled in the art. Various changes in the size, shape and arrangement of the parts may be adopted without departing from the spirit of the invention or the scope of the claims.

The invention claimed is:

1. In a clutch of the character described, a drive member, means for moving the drive member back and forth in such manner that it is in a momentary state of rest in certain phases of its cycle of movement, a driven member normally in a state of rest when not connected to the drive member, cooperating means between said members positionable to connect the same and also positionable to disconnect the same, and means controllable at will and operable with a snap action when the drive member is in a momentary state of rest and the driven member is in a state of rest to instantaneously position said cooperating means to connect said drive and driven members and to hold the same connected throughout any desired period.

2. A clutch of the character described comprising a driving member provided with a hook, a driven member provided with a pin, said members being arranged for relative movement with respect to each other to permit said hook to engage with said pin when said driving member is in a definite predetermined position with respect to said driven member whereby the latter is connected to said driving member for movement therewith, a spring carried by said driving member and urging said hook into engaging relation with said pin, means carried by and movable with said driving member and adapted for movement to a given position with respect to the latter to hold said hook against movement under the action of said spring into engaging relation with said pin and for movement to a different position with respect to said driving member to permit instantaneous movement of said hook under the action of said spring into engaging relation with said pin, and means adapted and arranged to effect said movements of said first-mentioned means to said different positions when said driving member is substantially in said predetermined position with respect to said driven member.

3. In a clutch of the character described, a shaft, driving and driven members mounted upon said shaft for pivotal movement with respect to each other into and out of operative relation when said driving member is in a definite predetermined position with respect to said driven member, a spring carried by said driving member and urging the same into operative relation with said driven member, means carried by and movable with said driving member and adapted for movement to a given position with respect to the latter to hold the same against movement under the action of said spring into operative relation with said driven member and for movement to a different position with respect to said driving member to permit instantaneous movement thereof under the action of said spring into operative relation with said driven member, and means adapted and arranged to effect said movements of said first-mentioned means to said different positions thereof with respect to said driving member when the latter is substantially in said predetermined position with respect to said driven member.

4. In a clutch of the character described, a shaft, a driven member mounted upon said shaft and provided with a pin, a driving member mounted upon said shaft for pivotal movement with respect to said driven member and provided with a hook arranged for engagement with said pin when said members are in a definite predetermined position with respect to each other whereby the latter are connected for movement together, a spring carried by said driving member and arranged to urge said hook into engaging relation with said pin, means adapted to effect movement of said hook against the action of said spring to inoperative position and to hold said hook in said position or to permit instantaneous movement of said hook under the action of said spring into engaged relation with said pin, said spring acting to hold said hook in said engaged relation with said pin, and means operable at the will of the operator and arranged for coaction with said last-mentioned means whereby the latter may be caused to perform either of its said functions when said members are substantially in said predetermined position with respect to each other.

5. In a clutch of the character described, a shaft, a driven member mounted upon said shaft and provided with a pin, a driving member mounted upon said shaft for pivotal movement with respect to said driven member and provided with a hook arranged for engagement with said pin when said members are in a definite predetermined position with respect to each other whereby the latter are connected for movement together, a spring carried by said driving member and arranged to urge said hook into engaging relation with said pin, means adapted to effect movement of said hook against the action of said spring to inoperative position and to hold said hook in said position or to permit instantaneous movement of said hook under the action of said spring into engaged relation with said pin, said spring acting to hold said hook in said engaged relation with said pin, and means operable at the will of the operator and arranged for coaction with said last-mentioned means whereby the latter may be caused to perform either of its said functions when said members are substantially in said predetermined position with respect to each other, said first-mentioned means comprising elements pivotally connected to each other and to said driving member and said hook and arranged to form a toggle.

6. In a clutch of the character described, the combination with driving and driven members arranged for movement into and out of engaged relation with each other, of a toggle mechanism associated with said driving member and having a dead-center position, means urging said driving member into engaged relation with said driven member, the respective elements comprising said toggle being movable to a position one side of said dead-center position whereby said driving member is moved to and held in inoperative position, said elements being movable to a position on the other side of said dead-center position to permit movement of said driving member under the action of said means into engaged relation with said driven member, and means adapted for coaction with said toggle mechanism to effect movement thereof to said positions on either side of said dead-center position.

7. In a clutch of the character described, a drive member, means for moving the drive member back and forth in such manner that it is in a momentary state of rest in certain phases of its cycle of movement, a driven member normally in a state of rest when not connected to the drive member, cooperating means between said members positionable to connect the same and also positionable to disconnect the same, a toggle mechanism between said cooperating means and said drive member, said toggle means in one position positioning said cooperating means to connect said members and in its other position positioning said cooperating means to disconnect said members, an abutment with which said toggle means is engageable when the members have been shifted to one extreme position and are in a momentary state of rest, said abutment coacting with said toggle to shift the same from one position to another.

8. In a clutch of the character described, a driven member, a driving member arranged for reciprocatory movement with respect to said driven member and adapted for operative engagement therewith when substantially at the end of a stroke, means adapted to impart said reciprocatory movement to said driving member continuously, a spring carried by said driving member and urging the latter into engaged relation with said driven member, a toggle mechanism associated with said driving member and having a dead-center position, the respective elements comprising said toggle being movable to a position one side of said dead-center position whereby said driving member is moved to and held in inoperative position, said elements being movable to a position on the other side of said dead-center position to permit instantaneous movement of said driving member under the action of said spring into operative engagement with said driven member, and means operable at the will of the operator and arranged for coaction with said toggle mechanism to effect movement thereof to either side of said dead-center position when said driving member is substantially at the end of said stroke.

9. In a clutch of the character described, a shaft, driving and driven members mounted on said shaft for movement into and out of engaged relation with each other, a toggle mechanism associated with said driving member for movement therewith and having a dead-center position, means urging said driving member into engaged relation with said driven member, the respective elements comprising said toggle being movable to a position one side of said dead-center position whereby said driving member is moved to and held in inoperative position, said elements being movable to a position on the other side of said dead-center positon to permit movement of said driving member under the action of said means into engaged relation with said driven member, means adapted to engage a certain part of said toggle mechanism to effect movement thereof to said last-mentioned position, and means adapted to engage said toggle mechanism at a point intermediate said part and said shaft to effect movement of said driving member to said first-mentioned position.

10. In a clutch of the character described, a driven member, a driving member arranged for movement with respect to said driven member and provided with a connecting member movable with respect thereto to a given position to connect said driven member to said driving member for movement therewith and to a different position to disconnect said driven member from said driving member, a spring urging said connecting member into said first-mentioned position, a toggle mechanism having a dead-center position and comprising a plurality of elements pivotally connected together and to said driving and connecting members and arranged for movement to one side of said dead-center position to permit instantaneous movement of said connecting member under the action of said spring to said first-mentioned position and for movement to the other side of said dead-center position to effect movement of said connecting member to said second-mentioned position, one of said elements having a portion thereof extending outwardly beyond said connecting member, means adapted to engage said portion of said element whereby movement of said connecting member to said first-mentioned position under the action of said spring is effected, and means adapted to engage said toggle mechanism to cause movement of said connecting member to said second-mentioned positon.

11. In a clutch of the character described, a drive member, means for moving the drive member back and forth in such manner that it is in a momentary state of rest in certain phases of its cycle of movement, a driven member normally in a state of rest when not connected to the drive member, cooperating means between said members positionable to connect the same and also positionable to disconnect the same, a toggle mechanism between said cooperating means and said drive member, said toggle means in one position positioning said cooperating means to connect said members and in its other position positioning said cooperating means to disconnect said members, a plurality of abutments selectively cooperable with the toggle to shift the same in one or the other direction.

12. In a clutch of the character described, a drive member, means for moving the drive member back and forth, a driven member, a connecting member pivoted to the drive member, said connecting member and said driven member having interengaging means positionable to connect the drive and driven members and also positionable to disconnect the same, a toggle connected with the connecting member and with the drive member, said toggle in one position swinging the connecting member to cause the interengageable means between the connecting member and the driven member to connect the drive member with the driven member and in its other position to cause these parts to disconnect the drive member from the driven member, spring means cooperable with the toggle mechanism to bias it to either of its positions when its elements are moved one way or the other beyond dead center, and means cooperable with the toggle for automatically shifting the same.

13. In a clutch of the character described, a drive member, means for moving the drive member back and forth, a driven member, a connecting member pivoted to the drive member, said connecting member and said driven member having interengaging means positionable to connect the drive and driven members and also positionable to disconnect the same, a toggle connected with the connecting member and with the drive member, said toggle in one position swinging the connecting member to cause the interengageable means between the connecting member and the driven member to connect the drive member with the driven member and in its other position to cause these parts to disconnect the drive member from the driven member, spring means cooperable with the toggle mechanism to bias it to either of its positions when its elements are moved one way or the other beyond dead center, and means cooperable with the toggle for automatically shifting the same and comprising a plurality of abutments selectively engageable with the toggle.

14. In a clutch of the character described, a rockable drive member, means for rocking the same, a rockable driven member, a connecting member pivoted to the drive member, interengaging means between the connecting member and the driven member positionable to positively connect the drive and driven members and also positionable to disconnect the same, a toggle having a link pivotally connected to the drive member and a link pivotally connected to the driven member, said links being pivotally connected to each other, spring means interposed between the drive member and the connecting member to swing the connecting member to cause it to bias the toggle to either of its extreme positions when it is swung past dead center, and means for shifting said toggle member.

15. In a clutch of the character described, a drive member, means for moving the drive member back and forth in such manner that it is in a momentary state of rest in certain phases of its cycle of movement, a driven member normally in a state of rest when not connected to the drive member, cooperating means between said members positionable to connect the same and also positionable to disconnect the same, and means operable with a snap action when the drive member is in a momentary state of rest and the driven member is in a state of rest to instantaneously position said cooperating means to connect said drive and driven members.

16. In a clutch of the character described, a drive member, means for moving the drive member back and forth in such manner that it is in a momentary state of rest in certain phases of its cycle of movement, a driven member normally in a state of rest when not connected to the drive member, cooperating means between said members positionable to connect the same and also positionable to disconnect the same, and means including a spring biased toggle operable with a snap action when the drive member is in a momentary state of rest and the driven member is in a state of rest to instantaneously position said cooperating means to connect said drive and driven members In witness whereof I hereto affix my signature.

ALFRED LAUKHUFF.